J. A. COWAN.
GRAIN CLEANING MACHINE.
APPLICATION FILED SEPT. 26, 1918.
1,356,043.
Patented Oct. 19, 1920.
2 SHEETS—SHEET 1.
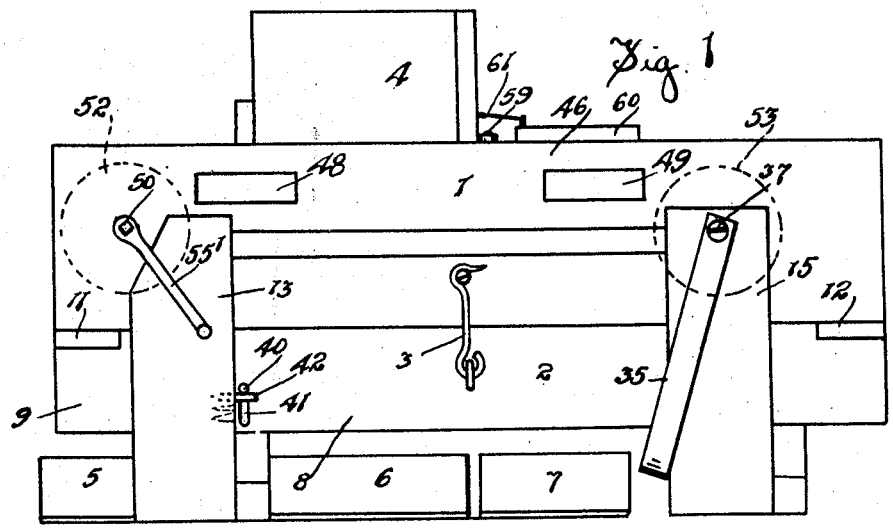
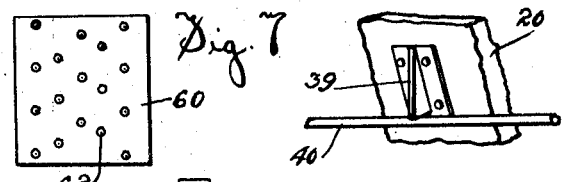
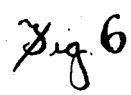
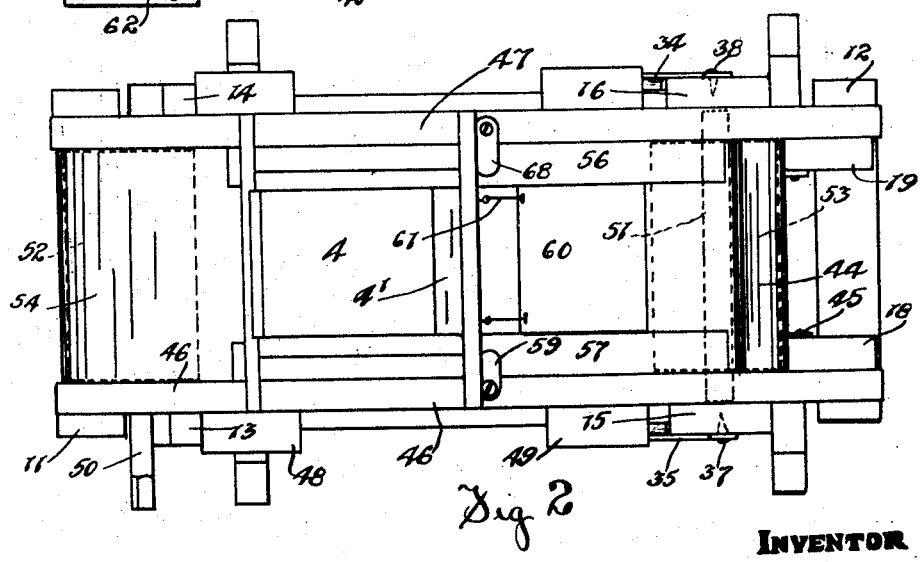
INVENTOR
J. A. Cowan
BY
ATTYS

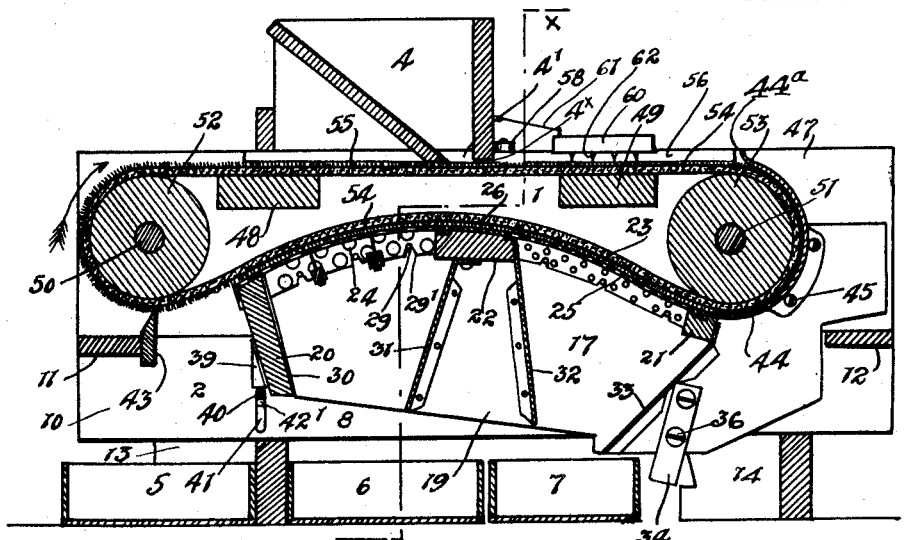
Fig. 4
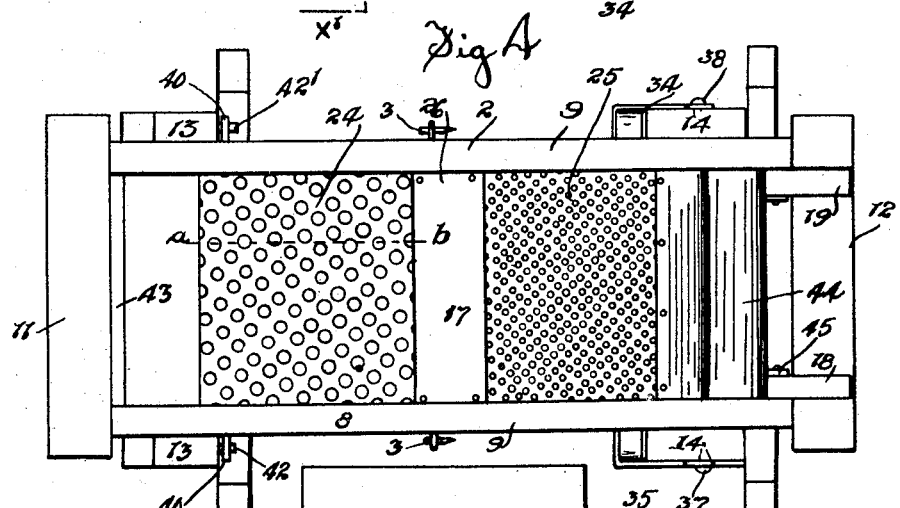
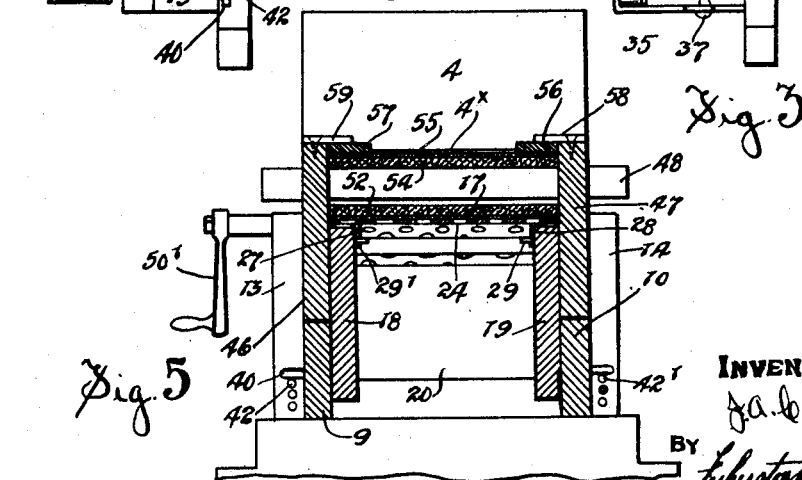
Fig. 5

UNITED STATES PATENT OFFICE.

JOHN ALEXANDER COWAN, OF WINNIPEG, MANITOBA, CANADA.

GRAIN-CLEANING MACHINE.

1,356,043.     Specification of Letters Patent.     Patented Oct. 19, 1920.

Application filed September 26, 1918. Serial No. 255,806.

*To all whom it may concern:*

Be it known that I, JOHN ALEXANDER COWAN, of the city of Winnipeg, in the Province of Manitoba, Canada, have invented certain new and useful Improvements in Grain-Cleaning Machines, of which the following is the specification.

The invention relates to improvements in grain cleaning machines, particularly to a machine for separating wheat, wild oats and weed seeds and the principal object of the invention is to provide a simply constructed, easily operated, durable and efficient machine to separate the wheat, oats and weed seeds and which will deposit the wheat, oats and obnoxious seeds in separate collecting pans.

A further object of the invention is to construct the machine so that it has no vibrating parts and so that the material passed through it is separated by the action of an endless belt operating over an arched screen.

A still further object of the invention is to construct the parts so that the belt can be tightened up when desired and also so that the working parts of the machine can adjust themselves to various irregularities which might occur due to foreign material getting in between the belt and screen.

A still further object of the invention is to arrange the screens so that they can be readily removed and to construct them so that a kernel of grain passing over them will be compelled to pass centrally over one of the perforations in the screens.

With the above objects in view the invention consists essentially in the arrangement and construction of parts hereinafter more particularly described and later pointed out in the appended claims reference being had to the accompanying drawings in which:—

Figure 1 represents a side view of the complete machine.

Fig. 2 represents a plan view thereof.

Fig. 3 represents a plan view with the belt section removed to expose the screens.

Fig. 4 represents a longitudinal sectional view centrally through the machine.

Fig. 5 represents a cross sectional view through the machine, the section being taken in the plane denoted by the line X—X′ Fig. 4.

Fig. 6 represents a perspective view of a portion of the lug and the cross rod.

Fig. 7 represents an inverted plan view of the rake.

In the drawings like characters of reference indicate corresponding parts in the several figures.

The machine as at present constructed resolves itself into a top belt section 1 and a bottom screen section 2 suitably fastened together such as by side hooks 3, a hopper 4 and collecting pans 5, 6 and 7 located beneath the screen section.

As intimated, the conveyer section is removable from the bottom section, being released by the undoing of the side hooks.

The bottom section is constructed in detail as now described.

It comprises a substantially rectangular frame 8 formed from side beams 9 connected, by end beams 11 and 12, the frame being supported by pairs of legs 13, and 14 permanently secured to the outer faces of the side beams and having their upper ends all extending above the level of the side beams.

The frame carries a screen deck 17 which takes a position between the side beams and is formed from side boards 18 and 19 connected at one end by a cross board 20 and at the other end by a cross beam 21 and fitted centrally with a cross board 22.

It will here be noticed that the side boards have their upper edges curved and as indicated at 23, rising gradually from the ends to the center with the result that the upper open face of the deck presents an arched appearance. This arched deck carries two perforated screens 24 and 25 which are separated by a centrally disposed cross plate 26 located at the peak of the arch.

The screen 25 presents comparatively small perforations adapting it for separating the oats and wheat from the smaller seeds, the oats and wheat being passed over the screen while the smaller seeds drop through the perforations.

The screen 24 is provided with comparatively large perforations adapted to prevent the dropping through of oats but to allow of the escape of wheat through the perforations.

Here I wish it to be noted that while the perforations in the screens appear in staggered rows, as is customary, I have placed the screens on the neck in what might be termed an angular position so that a kernel of grain in passing over the screen will be compelled, regardless of where it starts, to pass centrally over one of the perforations in the screen. This will be best understood by referring to Fig. 3 where I have applied a dotted line $a$—$b$ passing lengthwise of the screen and parallel with the sides of the deck. Here it will be observed that this line crosses centrally one of the right hand perforations in the screen 24 and also crosses centrally the end perforation in the next row at the left hand end of the machine. By so adjusting the screens it will be apparent that no matter where a kernel of grain starts over the screen it will be led so that it will have to cross one of the openings.

In order to allow of the removal of the screens I have turned the edges thereof inwardly and downwardly as indicated at 27 and 28 (Fig. 5) to bring the edges to the inner sides of the side boards 18 and 19. I then vertically slot the downturned edges as indicated at 29' to receive side pins 29 which prevent the screens from end movement on the deck. Between the side boards the deck is provided with cross deflectors 30, 31, 32 and 33 which provide with the side boards chutes for directing the material dropped through the screen 24 to the underlying pan 6 and material dropped through the screen 25 to the underlying pan 7.

The screen deck is supported at the right hand end by side hangers 34 and 35 which are permanently secured as indicated at 36 to the side boards 18 and 19 and have their upper ends pivotally mounted on side pins 37 and 38 extending from the upper ends of the legs 14. These side pins are axially alined.

The other or left hand end of the screen deck is fitted with a downwardly extending lug 39 which rides on a cross rod 40 which has the ends thereof passing through vertically disposed slots 41 provided in the sides of the frame and carried by adjusting pins 42 and 42' extending into suitable openings in the legs 13. A series of adjusting openings are supplied in each leg so that one by adjusting the pins can raise or lower the cross rod and so effect the up or down swinging of the left hand end of the deck. In this latter movement it will be obvious that the deck actually swings on the pins 37 and 38.

Adjacent the inner edge of the cross board 11 I have located a vertically disposed cross scraper 43 for a purpose later disclosed and at the opposite end of the machine between the side boards 18 and 19 I have located a curved pressure plate 44 which is permanently secured to the side boards as shown at 45 and has the lower end thereof secured to the adjoining end of the screen deck and continuous with the end of the screen 25.

The pressure plate has a slightly outwardly curved upper edge, as shown at $44^a$, Fig. 4, which guides the material in between the plate and belt which latter holds the material against the belt while it is traveling from the upper horizontal position to the inverted position where it contacts with the screen belt. Furthermore the pressure plate causes certain foreign materials to embed themselves in the nap of the belt where they stick until removed by the scraper 43.

The above completes the description of the lower section of the machine and the screen deck and pans.

The upper section of the machine comprises a conveyer frame formed from side sills 46 and 47 connected by cross boards 48 and 49 with the frame constructed so that it will lie on top of the bottom frame to the sides of the deck and within the upper ends of the legs.

In the opposite ends of the latter frame I mount a pair of parallel cross shafts 50 and 51 which are provided with rollers 52 and 53 on which I mount an endless belt 54. The shaft 51 is axially alined with the pins 37 and 38 so that the screen deck is swung from the center of the roller 53. One of the shafts is projected to receive a crank 50' whereby the belt can be driven but it will be readily understood that the crank could be dispensed with and the machine belt be otherwise driven.

In connection with the conveyer it will be noticed that the rollers lie one over the scraper and the other within the curved plate 44 with the belt bearing against the plate and that the top side of the belt lies flat, while the underside thereof bears on the arched face of the screen deck. By the adjustment given the screen deck it will be obvious that the belt can be held taut at all times. I desire that the outer face of this belt have considerable nap as indicated at 55 in order that the seeds and grain passing between the belt and the deck may more or less bury themselves in the nap of the belt.

On the conveyer frame I mount the hopper 4 which is provided with an outlet opening 4' leading to the belt and with a clearance space $4^x$ above the belt on the forward side of the hopper. The hopper is provided with a pair of extending guard bars 56 and 57 which lie on the top face of the belt and prevent the grain from escaping over the edges of the belt. These bars terminate above the rollers 53.

The hopper with the bars is removable from the conveyer section, being held in position by a pair of buttons 58 and 59 which prevent the hopper from moving ahead with the belt and which can be turned to clear the bars over which they lie and allow the hopper to be removed.

In advance of the hopper and riding on the conveyer I place a floating rake 60 which is tied to the hopper by the wires 61. This rake comprises a back piece fitted with extending teeth 62 arranged as shown best in Fig. 7 where it will be seen that the teeth are in staggered relation.

The manner in which the machine is used to clean mixed grains such as wheat, wild oats and obnoxious seeds, assuming that the deck has been adjusted to draw the belt sufficiently tight, will be now described.

The grain is placed in the hopper and the conveyer operated. The mixed grains leaving the hopper by way of the opening 4' pass forwardly on the belt and between the guard bars 56 and 57 and beneath the rake to the front end of the machine where they enter between the plate and belt and pass to the end of the first screen 25 of the deck.

In passing under the rake the kernels of the larger grains are struck by the teeth and brought so that they lie more or less lengthwise of the conveyer and pass undisturbed in this position to the plate which co-acts with the roller to maintain them so until they are presented to the screens. Here the initial separation takes place, the smaller seeds falling through the perforations and the wheat and oats being carried over the screen in a sliding action by the belt and over the plate 26 to the second screen. At the second screen the wheat is free to drop through the perforations but the oats are glided over the perforations by the belt and are finally discharged over the end of the deck and caught by the pan 5. Any material clinging to the surface of the belt is removed by the scraper and falls down into the pan. The wheat obviously will drop into the pan 6 and the small seeds into pan 7 so that the mixed grains fed into the machine are collected separately in the pans 5, 6 and 7.

In the normal operation of the machine it will be apparent that slight irregularities, which may occur through over crowding in the feed or foreign matter getting in between the belt and the deck, will be accommodated by the cross rod 40 which is resilient enough to spring down at the center and allow of a slight movement of the deck.

I wish to draw particular attention to the arching of the screen deck which provides what might be called a curved path as distinguished from a straight path which the grain is compelled to take while undergoing the separation.

In the arrangement as shown where the deck is arched and the belt revolving and operating over the arch it will be apparent that the pressure of the belt over the surface of the deck is evenly distributed with the result that the grain passed through the machine is at all times under the same pressure. To make this point clear I refer to the action which would occur if the deck were flat and the belt operating over it. In this latter case it will be readily apparent that while the belt might be bearing tightly against the ends of the deck, it would take but little upward pressure to raise the central portion of the belt and accordingly a kernel of grain situated at such central portion of the belt would not be held as tightly down against the deck as it would be at the end of the deck.

The curved path provided overcomes any such possibility and a kernel of grain is subjected to a constant pressure from one end of the deck to the other.

A further feature of advantage is that by virtue of the arch or curved path given, the leading end of a kernel of grain, such as a kernel of oats is kept well away from the deck with the result that it has less tendency to be caught by the edge of a perforation.

From the latter paragraphs it will be seen that the emphasized features are present regardless of what part moves and what part is stationary. That is to say either the belt or the deck could be stationary and the separation would be effected in accordance with this feature of my invention.

While I have described the machine in detail, it will be readily understood that the arrangement shown could be readily modified without in the least departing from the spirit of the invention. Obviously the minor details of frame, deck and hopper construction could be readily changed without affecting the working of the machine as a whole.

What I claim as my invention is:—

1. In a grain cleaning machine a pair of rollers, an endless conveyer belt supported thereby with its upper portion substantially horizontal, a hopper for feeding material to the surface of said upper portion, means operating upon the horizontal portion of the belt between the hopper and the roller over which the belt travels downwardly to cause the material to lie parallel with the direction of travel of the belt, a screen surface bearing against the under portion of the belt between the rollers, and a guide plate around the downwardly moving portion of the belt.

2. In a machine of the class described, a pair of rollers, a belt having a nap surface supported thereby with its upper surface substantially horizontal, a hopper for feeding material to the upper surface of the belt, a rake acting on the material on said horizontal portion after it leaves the hopper, a presser plate encircling the belt when it passes around over a roller for pressing the material into the nap, a sieve acting against the under surface of the lower portion of the belt, and a scraper acting on the belt after it leaves said screen.

3. In a machine of the class described, a pair of rollers, a belt having a nap surface supported thereby with its upper surface substantially horizontal, a hopper for feeding material to the upper surface of the belt, a floating rake acting on the material on said horizontal portion after it leaves the hopper, a presser plate encircling the belt when it passes around over a roller for pressing the material into the nap, a sieve acting against the under surface of the lower portion of the belt, and a scraper acting on the belt after it leaves said screen.

4. In a grain cleaning machine, the combination with a pair of end rollers and an endless conveyer mounted on the rollers, of an arched perforated deck engaging the underside of the conveyer and having one end pivotally swung from points lying on the longitudinal axis of one of the rollers, an adjustably suspended cross rod adjoining the other end of the deck and a lug extending from the latter end of the deck and riding on the cross rod.

5. In a grain cleaning machine, the combination with an endless conveyer, of an adjustable arched deck frame having a sieve surface comprising two perforated screen sections engaging with the underside of the conveyer, the perforations in one of said sections differing in size from the perforations in the remaining section and deflector plates within the frame forming in conjunction with adjacent portions of the frame, separate chutes located one beneath each of said screen sections.

Signed at Winnipeg, this 5th day of September, 1918.

JOHN ALEXANDER COWAN.

In the presence of—
G. S. BOXBURGH,
K. B. WAKEFIELD.